United States Patent
Yamazaki

(10) Patent No.: US 10,202,895 B2
(45) Date of Patent: Feb. 12, 2019

(54) CONTROL DEVICE OF A VEHICLE, VEHICLE INCLUDING CONTROL DEVICE, AND CONTROL METHOD OF VEHICLE

(75) Inventor: Makoto Yamazaki, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1030 days.

(21) Appl. No.: 14/358,604

(22) PCT Filed: Nov. 28, 2011

(86) PCT No.: PCT/JP2011/077365
§ 371 (c)(1),
(2), (4) Date: May 15, 2014

(87) PCT Pub. No.: WO2013/080273
PCT Pub. Date: Jun. 6, 2013

(65) Prior Publication Data
US 2014/0311426 A1    Oct. 23, 2014

(51) Int. Cl.
| | |
|---|---|
| *F02B 63/00* | (2006.01) |
| *F02B 63/04* | (2006.01) |
| *B60K 6/445* | (2007.10) |
| *B60W 10/06* | (2006.01) |
| *B60W 30/18* | (2012.01) |
| *B60W 20/13* | (2016.01) |

(52) U.S. Cl.
CPC ............. *F02B 63/04* (2013.01); *B60K 6/445* (2013.01); *B60W 10/06* (2013.01); *B60W 20/13* (2016.01); *B60W 30/18054* (2013.01); *B60W 2510/0671* (2013.01); *B60W 2520/04* (2013.01); *Y02T 10/6239* (2013.01)

(58) Field of Classification Search
CPC ............................. H02N 2/18; B60W 30/1886
USPC .............. 123/2; 290/40 R; 701/102; 322/28; 307/10.1
See application file for complete search history.

(56) References Cited

U.S. PATENT DOCUMENTS

| | | | | |
|---|---|---|---|---|
| 5,767,636 A | * | 6/1998 | Kanazawa | ............ H02J 7/1446 318/139 |
| 5,808,367 A | * | 9/1998 | Akagi | ................... F02D 31/005 123/339.18 |
| 6,026,794 A | * | 2/2000 | Kadowaki | ............... F02D 41/22 123/674 |
| 2006/0047398 A1 | * | 3/2006 | Abe | ..................... B60H 1/3222 701/69 |

(Continued)

FOREIGN PATENT DOCUMENTS

| | | |
|---|---|---|
| JP | A-63-50645 | 3/1988 |
| JP | B2-7-26579 | 3/1995 |

(Continued)

*Primary Examiner* — Marguerite McMahon
*Assistant Examiner* — James Kim
(74) *Attorney, Agent, or Firm* — Oliff PLC

(57) ABSTRACT

A vehicle includes at least one sensor generating a signal to control an operation of an internal combustion engine; and a control unit configured to store a control parameter to control an operation of the internal combustion engine, and to correct the control parameter based on an output of the at least one sensor. The control unit stops correcting the control parameter while the vehicle is at a halt, and the power generator is generating electric power by driving of the internal combustion engine.

5 Claims, 11 Drawing Sheets

(56) References Cited

U.S. PATENT DOCUMENTS

| | | | |
|---|---|---|---|
| 2008/0022958 A1* | 1/2008 | I | F02D 41/0002 123/179.3 |
| 2010/0174468 A1* | 7/2010 | Surnilla | F02D 31/002 701/103 |
| 2011/0139096 A1 | 6/2011 | Niimi | |
| 2013/0033237 A1* | 2/2013 | Kim | B60L 1/00 322/25 |

FOREIGN PATENT DOCUMENTS

| | | |
|---|---|---|
| JP | A-7-103043 | 4/1995 |
| JP | A-11-107829 | 4/1999 |
| JP | A-2000-234539 | 8/2000 |
| JP | A-2001-41073 | 2/2001 |
| JP | A-2001-231106 | 8/2001 |
| JP | A-2008-195279 | 8/2008 |
| JP | A-2010-36601 | 2/2010 |
| JP | A-2010-264817 | 11/2010 |
| JP | A-2011-122502 | 6/2011 |

* cited by examiner

CONTROL DEVICE OF A VEHICLE, VEHICLE INCLUDING CONTROL DEVICE, AND CONTROL METHOD OF VEHICLE

TECHNICAL FIELD

The present invention relates to a control device of a vehicle, a vehicle including the control device, and a control method of the vehicle. More particularly, the present invention relates to control of a vehicle configured to allow electric power to be supplied outside of the vehicle.

BACKGROUND ART

Japanese Patent Laying-Open No. 2000-234539 (PTD 1) discloses a control device of a hybrid vehicle. The hybrid vehicle includes an internal combustion engine (hereinafter, referred to as "engine"), exhaust gas purifying means for purifying exhaust gas from the engine using a catalyst, a motor generator, and an external terminal to supply electric power generated by the motor generator outside of the vehicle. The control device includes a switch to switch the normal mode to a power generation mode for external power feeding. In the power generation mode, the control device maintains the engine at a speed greater than or equal to a predetermined speed in order to activate the catalyst of the exhaust gas purifying means.

CITATION LIST

Patent Document

PTD 1: Japanese Patent Laying-Open No. 2000-234539
PTD 2: Japanese Patent Laying-Open No. 2001-231106
PTD 3: Japanese Patent Laying-Open No. 63-50645 (Patent Publication No. 7-26579)
PTD 4: Japanese Patent Laying-Open No. 11-107829
PTD 5: Japanese Patent Laying-Open No. 2010-36601
PTD 6: Japanese Patent Laying-Open No. 7-103043

SUMMARY OF INVENTION

Technical Problem

Japanese Patent Laying-Open No. 2000-234539 (PTD 1) does not specifically teach control of the engine in a normal mode. The engine usage status in the power generation mode differs from the engine usage status in the normal mode. After the control mode returns to the normal mode from the power generation mode, engine control suitable for vehicle running must be executed.

An object of the present invention is to provide the technique to appropriately control the operation of an internal combustion engine during vehicle running at a vehicle having the internal combustion engine used for power generation and vehicle running.

Solution to Problem

A control device of a vehicle according to an aspect of the present invention is directed to a control device of a vehicle including a power generator and an internal combustion engine. The internal combustion engine is used for running the vehicle and for driving the power generator. The control device includes at least one sensor generating a signal to control an operation of the internal combustion engine, and a control unit configured to store a control parameter to control an operation of the internal combustion engine and to correct the control parameter based on the signal of the at least one sensor. The control unit stops correction of the control parameter while the vehicle is at a halt and the power generator is generating electric power by driving of the internal combustion engine.

Preferably, the vehicle further includes an electric circuit configured to allow electric power generated at the power generator to be output outside of the vehicle. The control unit stops update of the control parameter while the vehicle is set at a state such that electric power generated from the power generator is output outside of the vehicle by the electric circuit.

Preferably, the control parameter is at least one of an air-fuel ratio, a timing retarding amount of ignition timing, and air intake amount during an idling operation of the internal combustion engine.

Preferably, the control unit includes a parameter updating unit configured to update the control parameter, and a prohibition unit instructing the parameter updating unit to prohibit update of the control parameter when the vehicle is at a halt and the power generator is generating power.

A vehicle according to another aspect of the present invention includes a power generator, an internal combustion engine used for running the vehicle and driving the power generator, at least one sensor generating a signal to control an operation of the internal combustion engine, and a control unit configured to store a control parameter to control an operation of the internal combustion engine, and to correct the control parameter based on the signal of the at least one sensor. The control unit stops correction of the control parameter while the vehicle is at a halt and the power generator is generating electric power by driving of the internal combustion engine.

A control method of a vehicle according to a further aspect of the present invention is directed to a control method of a vehicle including a power generator and an internal combustion engine. The internal combustion engine is used for running the vehicle and for driving the power generator. The control method includes the steps of: correcting a control parameter to control the internal combustion engine based on an output of at least one sensor generating a signal to control an operation of the internal combustion engine; detecting that the state of the vehicle is at a halted state and a power generatable state in which the power generator can generate electric power by driving of the internal combustion engine; and stopping correction of the control parameter to control the internal combustion engine when the power generatable state is detected.

Preferably, the vehicle further includes an electric circuit configured to allow electric power generated by the power generator to be output outside of the vehicle. The step of stopping stops update of the control parameter while the vehicle is set at a state such that electric power generated from the power generator is output outside of the vehicle by the electric circuit.

Preferably, the control parameter includes at least one of an air-fuel ratio, a timing retarding amount of ignition timing, and air intake amount during an idling operation of the internal combustion engine.

Advantageous Effects of Invention

According to the present invention, the operation of the internal combustion engine during vehicle running can be controlled appropriately at a vehicle that uses the internal combustion engine for power generation and for vehicle running.

DESCRIPTION OF EMBODIMENTS

Figure 1:
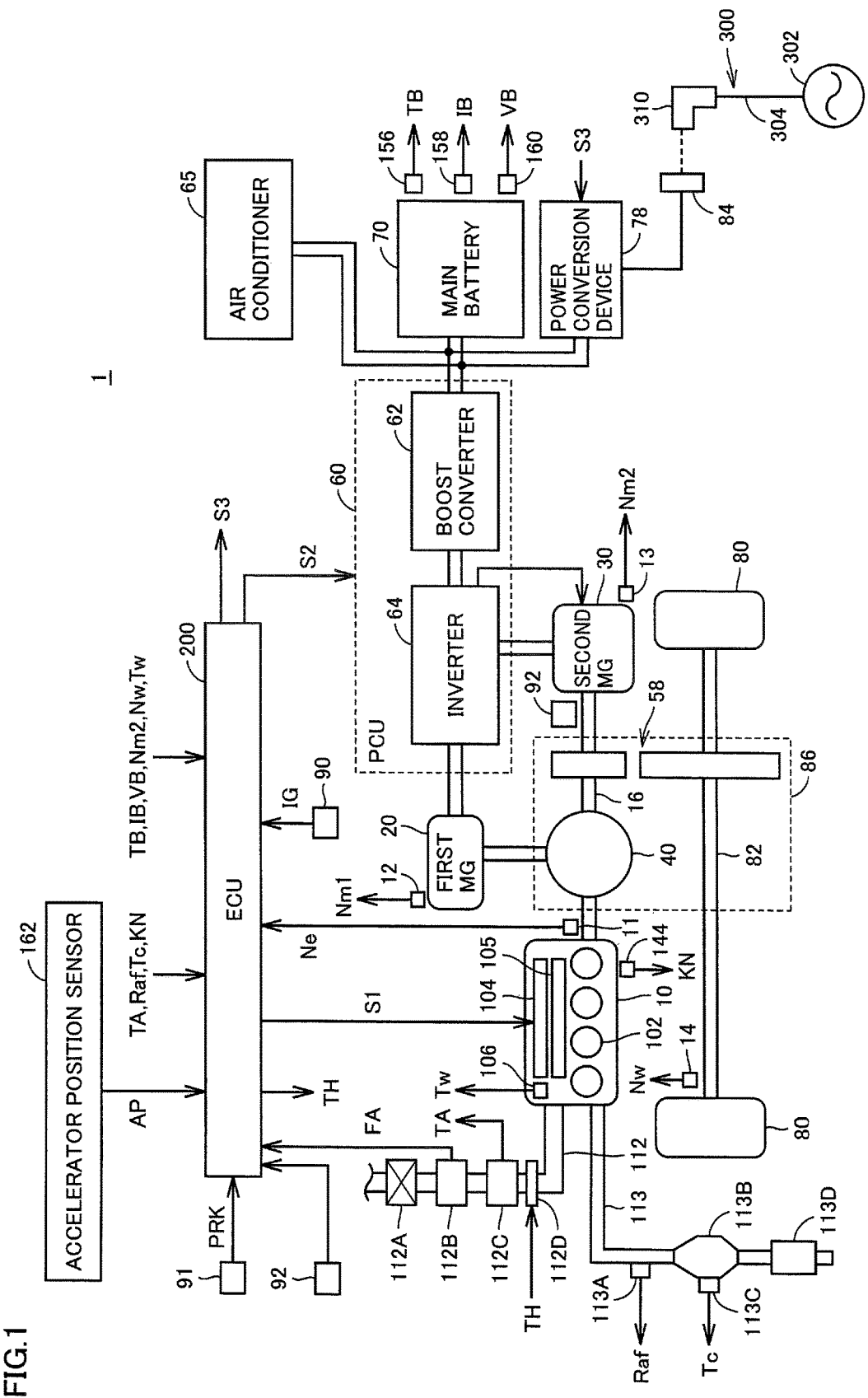
FIG. 1 represents an entire block diagram of a vehicle 1 according to a first embodiment of the present invention.

Embodiments of the present invention will be described in detail hereinafter with reference to the drawings. In the drawings, the same or corresponding elements have the same reference characters allotted, and description thereof will not be repeated.

First Embodiment

FIG. 1 is an entire block diagram of a vehicle 1 according to a first embodiment of the present invention. Referring to FIG. 1, vehicle 1 includes an engine 10, a first motor generator (hereinafter, referred to as first MG) 20, a second motor generator (hereinafter, referred to as second MG) 30, a PCU (Power Control Unit) 60, an air conditioner 65, a main battery 70, a power conversion device 78, a driving wheel 80, a transmission 86, and an ECU (Electronic Control Unit) 200. Transmission 86 includes a drive shaft 16, a power split device 40, a reduction gear 58, and an axle 82.

Vehicle 1 runs by the motive power output from at least one of engine 10 and second MG 30. The power generated by engine 10 is split into two paths by power split device 40. One and the other of the two paths are for transmitting power from engine 10 to driving wheel 80 via reduction gear 58 and for transmitting power from engine 10 to first MG 20, respectively.

First and second MGs 20 and 30 are 3-phase AC rotating electric machines, for example, driven by PCU 60.

First MG 20 functions as a generator. First MG 20 generates electric power utilizing the power of engine 10 divided by power split device 40. The electric power generated from first MG 20 is supplied to main battery 70 via PCU 60. Accordingly, main battery 70 is charged. First MG 20 also receives electric power from main battery 70 to rotate the crankshaft (output shaft) of engine 10. Accordingly, first MG 20 functions as a starter for starting engine 10.

Second MG 30 functions as a driving motor. Second MG 30 uses at least one of the electric power stored in main battery 70 and the electric power generated at first MG 20 to provide driving force to driving wheel 80. Second MG 30 also functions as a generator to generate electric power by regenerative braking. The electric power generated by second MG 30 is supplied to main battery 70 via PCU 60. Accordingly, main battery 70 is charged.

Engine 10 is an internal combustion engine such as a gasoline engine or diesel engine. Engine 10 includes a plurality of cylinders 102, a fuel injection device 104, an ignition device 105, an intake passage 112, and an exhaust passage 113. Fuel injection device 104 injects an appropriate amount of fuel at an appropriate timing to each cylinder based on a control signal S1 from ECU 200. Ignition device 105 includes a plurality of spark plugs corresponding to the plurality of cylinders, respectively. Ignition device 105 causes the spark plug in each cylinder to produce a spark at an appropriate ignition timing based on a control signal from ECU 200.

An air cleaner 112A, an air flow meter 112B, an intake air temperature sensor 112C, and an electronic throttle valve 112D are provided at intake passage 112 of engine 10. Air cleaner 112A captures the dust in the intake air. Air flow meter 112B detects the intake amount FA of air input to engine 10. Intake air temperature sensor 112C detects a temperature TA of air input to engine 10. Intake air temperature sensor 112C transmits a signal indicating the detected air temperature TA to ECU 200. Electronic throttle valve 112D includes a valve to adjust the amount of air input to engine 10, a throttle motor to actuate the valve based on a control signal TH from ECU 200, and a throttle valve position sensor. The throttle valve position sensor detects the opening of the valve to transmit a signal indicating the opening to ECU 200.

An air-fuel ratio sensor 113A, a 3-way catalytic converter 113B, a catalyst temperature sensor 113C, and a muffler 113D are provided at exhaust passage 113 of engine 10. 3-way catalytic converter 113B includes the catalyst purifying the exhaust gas from engine 10. Air-fuel ratio sensor 113A detects an air-fuel ratio (A/F) Raf using the exhaust gas introduced into 3-way catalytic converter 113B. Catalyst temperature sensor 113C detects a temperature Tc of 3-way catalytic converter 113B. Air-fuel ratio sensor 113A transmits a signal indicating the detected air-fuel ratio Raf to ECU 200. Catalyst temperature sensor 113C transmits a signal indicating a temperature Tc of 3-way catalytic converter 113B to ECU 200. An oxygen sensor may be used instead of air-fuel ratio sensor 113A.

A coolant temperature sensor 106 detects a temperature Tw of the coolant circulating in engine 10 (hereinafter, indicated as coolant temperature Tw). Coolant temperature sensor 106 transmits a signal indicating the detected coolant temperature Tw to ECU 200. A knocking sensor 144 detects knocking of engine 10 and transmits a signal KN indicating detection thereof to ECU 200.

An engine speed sensor 11 detects the rotating speed of the crankshaft of engine 10 (hereinafter, indicated as engine speed) Ne. Engine speed sensor 11 transmits a signal indicating the detected engine speed Ne to ECU 200.

Power split device 40 mechanically couples three elements constituted of a drive shaft 16 to rotate driving wheel 80, the output shaft of engine 10, and the rotational shaft of first MG 20 with each other. Power split device 40 uses one of the three elements as a reaction element to allow power transmission between the remaining two elements. The rotational shaft of second MG 30 is coupled with drive shaft 16.

Power split device 40 is a planetary gear set including a sun gear, a pinion gear, a carrier, and a ring gear. The pinion gear meshes with each of the sun gear and ring gear. The carrier supports the pinion gear to allow turning on its axis, and is coupled with the crankshaft of engine 10. The sun gear is coupled to the rotational shaft of first MG 20. The ring gear is coupled to the rotational shaft of second MG 30 via drive shaft 16 and to reduction gear 58.

Reduction gear 58 transmits the power from power split device 40 and second MG 30 to driving wheel 80. Reduction gear 58 also transmits to power split device 40 and second MG 30 the reactive force from the road received at driving wheel 80.

PCU 60 converts the DC power stored in main battery 70 into AC power for driving first MG 20 and second MG 30. PCU 60 includes a boost converter 62 and an inverter 64. Boost converter 62 and inverter 64 are controlled based on a control signal S2 from ECU 200.

Boost converter 62 boosts the voltage of the DC power received from main battery 70, and outputs the boosted DC power to inverter 64. Inverter 64 converts the DC power output from boost converter 62 into AC power, which is output to first MG 20 and/or second MG 30. Accordingly, using the electric power stored in main battery 70, first MG 20 and/or second MG 30 is driven. Further, inverter 64 converts the AC power generated at first MG 20 and/or second MG 30 into DC power, which is output to boost converter 62. Boost converter 62 steps down the voltage of DC power output from inverter 64, which is output to main battery 70. Accordingly, main battery 70 is charged using the electric power generated by first MG 20 and/or second MG 30. It is to be noted that boost converter 62 may be omitted from the configuration shown in FIG. 1.

Main battery 70 is a power storage device, and a rechargeable DC power supply. Main battery 70 is connected to PCU 60. For example, a secondary battery such as a nickel-metal hydride battery or lithium ion battery can be used as main battery 70. The DC voltage of main battery 70 is approximately 200V, for example. Main battery 70 is not limited to a secondary battery, and may be a capacitor, solar cell, fuel cell or the like that can generate DC voltage.

Air conditioner 65 operates using the electric power in main battery 70. Air conditioner 65 is indicated in FIG. 1 as an example of an auxiliary machine.

Temperature sensor 156 detects a temperature TB of main battery 70. Current sensor 158 detects a current IB of main battery 70. Voltage sensor 160 detects a voltage VB of main battery 70. Temperature sensor 156 transmits a signal indicating temperature TB to ECU 200. Current sensor 158 transmits a signal indicating current IB to ECU 200. Voltage sensor 160 transmits a signal indicating voltage VB to ECU 200.

An accelerator position sensor 162 detects a stepped amount AP on the accelerator pedal (not shown). Accelerator position sensor 162 transmits a signal indicating a stepped amount AP of the accelerator pedal to ECU 200.

A first resolver 12 detects a rotational speed Nm1 of first MG 20. First resolver 12 transmits a signal indicating the detected rotational speed Nm1 to ECU 200. Second resolver 13 detects a rotational speed Nm2 of second MG 30. Second resolver 13 transmits a signal indicating the detected rotational speed Nm2 to ECU 200.

Wheel speed sensor 14 detects a rotational speed Nw of driving wheel 80. Wheel speed sensor 14 transmits a signal indicating the detected rotational speed Nw to ECU 200. ECU 200 calculates the vehicle speed based on the received rotational speed Nw. ECU 200 may calculate the vehicle speed based on a rotational speed Nm2 of second MG 30 instead of rotational speed Nw.

Power conversion device 78 converts the AC power supplied from an external power supply 302 into DC power for charging main battery 70. Power conversion device 78 also supplies the DC power of main battery 70 or the electric power generated by engine 10 and first MG 20 to outside the vehicle. Engine 10 drives first MG 20, causing generation of AC power therefrom. PCU 60 converts the AC power into DC power. Power conversion device 78 converts the DC power from PCU 60 into AC power. Power conversion device 78 can be implemented by one device capable of bidirectional power conversion between direct current and alternating current, for example. Alternatively, power conversion device 78 may be implemented by a combination of a feeding device converting direct current into alternating current and a charging device converting alternating current into direct current.

A power cable 300 is connected between a socket 84 of vehicle 1 and an external power supply 302. Power cable 300 includes a connector 310 that is connected to socket 84. Electric power is supplied from external power supply 302 to power conversion device 78 via power cable 300. The DC power of main battery 70 or the electric power generated by engine 10 and first MG 20 is supplied outside via power conversion device 78 and power cable 300.

ECU 200 generates a control signal S1 directed to controlling engine 10, and outputs the generated control signal S1 to engine 10. ECU 200 generates a control signal S2 directed to controlling PCU 60, and outputs the generated control signal S2 to PCU 60. ECU 200 further generates a control signal S3 directed to controlling power conversion device 78, and outputs the generated control signal S3 to power conversion device 78.

Vehicle 1 further includes an IG switch 90 operated manually. IG switch 90 applies to ECU 200 a start request and a stop request for the entire system of vehicle 1. The position operated through IG switch 90 includes an IG off position, an IG on position, and a start position. The IG off position is to set the system in a halted state (Ready-OFF state). The IG on system is to set the system in a conducting state (IG-ON state). The start position is to render the system in an activated state (Ready-ON state). IG switch 90 generates a signal IG to indicate each state of the system, and transmits the generated signal IG to ECU 200.

Vehicle 1 further includes a parking switch 91 that is operated manually. Parking switch 91 is to select the parking position among a plurality of shift positions. When parking switch 91 is operated, parking switch 91 transmits a signal PRK to ECU 200. Parking switch 91 may be a push switch, a lever switch, a rotary switch, or the like. The plurality of shift positions includes, in addition to the parking position, a neutral position, a forward run position, and a backward run position. A shift position other than the parking position is selected by a shift lever 92. Shift lever 92 transmits a signal indicating the selected shift position to ECU 200. The parking position may be selected by shift lever 92 instead of by parking switch 91.

When ECU 200 receives signal PRK from parking switch 91 and the shift position is a non-parking position, the shift position is switched from the non-parking position to the parking position. In this case, a parking lock device 93 anchors drive shaft 16 such that drive shaft 16 does not move under control of ECU 200. Accordingly, any transportation of vehicle 1 is restricted.

According to the configuration shown in FIG. 1, there is a power transmission path between engine 10 and drive shaft 16. There is also a power transmission path between second MG 30 and drive shaft 16. First MG 20 is arranged to generate power using at least a portion of the power generated by engine 10. In other words, engine 10 is used for both the running of vehicle 1 and the driving of first MG 20.

ECU 200 controls the entirety of the hybrid system such that vehicle 1 can be operated most efficiently by controlling engine 10, PCU 60, and the like. In other words, ECU 200 controls the charging and discharging of main battery 70, and the operation of engine 10, first MG 20, and second MG 30.

ECU 200 calculates the required driving power corresponding to the accelerator pedal stepping amount AP. ECU 200 controls the torque of first and second MGs 20 and 30, and the output of engine 10 according to the calculated required driving power.

When the efficiency of engine 10 is poor such as when vehicle 1 starts moving or when running at low speed, vehicle 1 stops engine 10 and runs by second MG 30 alone. During normal running of vehicle 1, the power of engine 10 is divided along two paths by power split device 40. Driving wheel 80 is directly driven by the power of one of the two paths. First MG 20 is driven to generate electric power by the power of the other of the two paths. At this stage, ECU. 200 drives second MG 30 using the generated electric power. Accordingly, second MG 30 supports the driving of driving wheel 80.

When the speed is reduced at vehicle 1, second MG 30 driven by the rotation of driving wheel 80 functions as a generator, whereby regenerative braking is effected. The electric power collected by regenerative braking is stored at main battery 70. In the case where main battery 70 has to be charged due to the drop of the remaining amount in main battery 70 (indicated as SOC (State of Charge) in the following description), ECU 200 increases the output from engine 10 to increase the amount of power generated by first MG 20. Accordingly, the SOC of main battery 70 is increased.

ECU 200 may provide control such that the driving power of engine 10 is increased, as necessary, even when vehicle 1 is running at low speed. For example, in the case where charging of main battery 70 is required, in the case where an auxiliary machine such as air conditioner 65 is driven, or when the temperature of the coolant of engine 10 is to be raised to a predetermined temperature, ECU 200 may increase the driving power of engine 10.

Moreover, in the case where air conditioner 65 is to be operated when vehicle 1 is at a halt, the electric power stored in main battery 70 is used if electric power is not supplied to vehicle 1 from an external source. When charging of main battery 70 is required, ECU 200 causes operation of engine 10. Engine 10 drives first MG 20 to cause first MG 20 to generate electric power. The electric power generated by first MG 20 is supplied by PCU 60 to air conditioner 65 via main battery 70, or together with main battery 70. Accordingly, the operation of air conditioner 65 can be continued while main battery 70 is charged.

Figure 2:
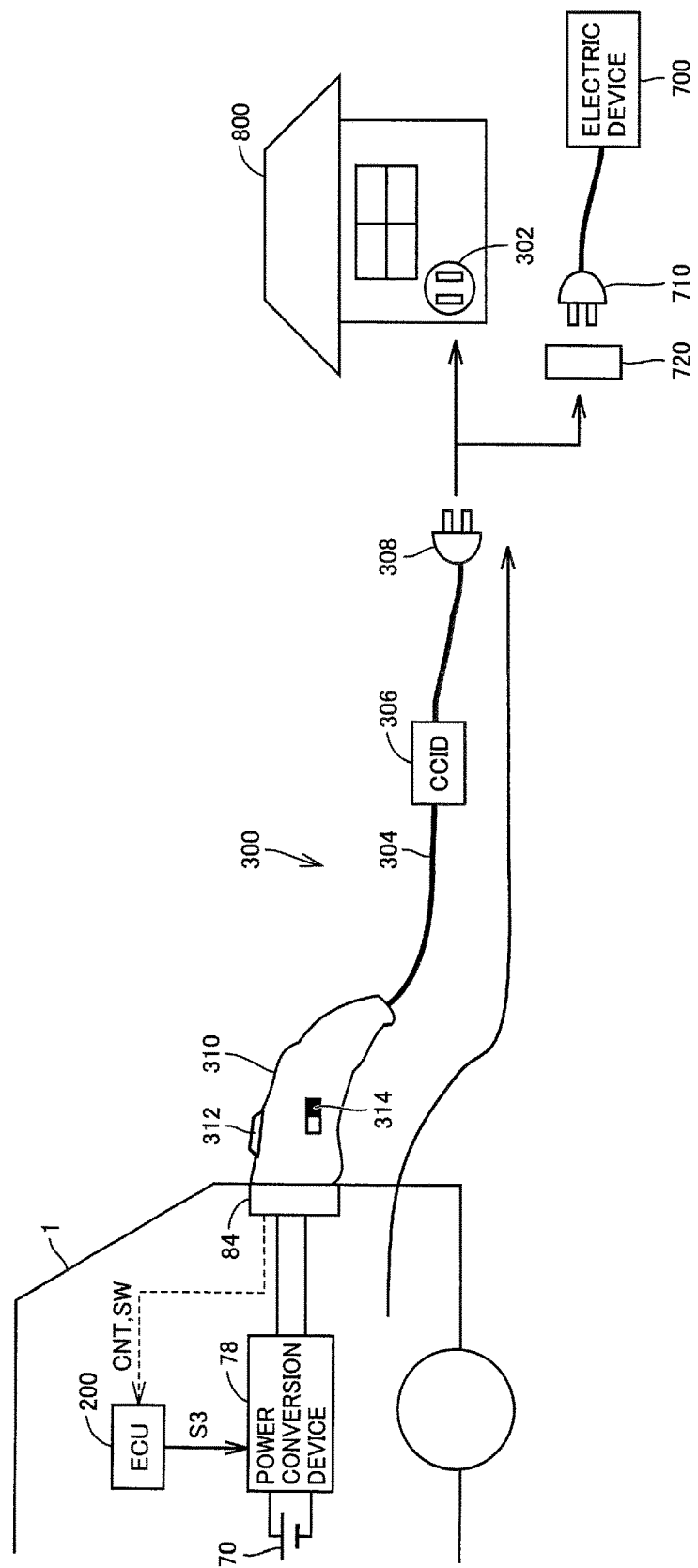
FIG. 2 schematically represents an example of a configuration for charging and power feeding of vehicle 1 according to the first embodiment of the present invention.

FIG. 2 is a schematic diagram representing an exemplified configuration for charging and power feeding of vehicle 1 according to the first embodiment of the present invention. Referring to FIG. 2, power cable 300 includes a connector 310, a power line 304, a CCID (Charging Circuit Interrupt Device) 306, and a plug 308. Connector 310 is arranged at one end of power line 304. Plug 308 is arranged at the other end of power line 304. CCID 306 is provided in the path of power line 304.

Connector 310 is connected to a socket 84 of vehicle 1. When main battery 70 of vehicle 1 is to be charged, plug 308 is connected to an external power supply 302. In FIG. 2, external power supply 302 is indicated as a socket provided at a house 800.

CCID 306 functions as a circuit to switch between supply of electric power from external power supply 302 to vehicle 1, and cut off of the supply. The operation of CCID 306 conforms to the standard determined by SAE (Society of Automotive Engineers) in the United States or by Japan Electric Vehicle Association.

Switches 312 and 314 are provided at connector 310, which are operated by the user. Switch 312 includes a mechanism to remove connector 310 from socket 84, for example. In association with the operation of switch 312, various control such as cutting off the supply of electric power by CCID 306 may be executed. In the case where connector 310 is connected with socket 84, as shown in FIG. 2, a signal CNT is sent from connector 310 to ECU 200 via socket 84. Signal CNT indicates the connection of connector 310 with socket 84.

Switch 314 functions to switch between charging and external power feeding of vehicle 1 (main battery 70). When charging is selected by switch 314, power cable 300 transmits the electric power from external power supply 302 to vehicle 1. When external power feeding is selected by switch 314, vehicle 1 performs external power feeding. Specifically, the first MG driven by the engine generates electric power. The electric power generated by the first MG is supplied outside of vehicle 1 via power cable 300. Plug 301 may transmit a signal SW corresponding to the operation of switch 314 to ECU 200. For example, signal SW attains a level Low and a level High when charging is selected and external power feeding is selected, respectively. ECU 200 responds to signals CNT and SW from power cable 300 to transmit to power conversion device 78 a control signal S3 directed to controlling power conversion device 78. The configuration of the power cable, the shape of the plug, and the like are not particularly limited.

For example, in case of power outage, plug 308 is connected to the socket of house 800, and vehicle 1 feeds power thereto. Accordingly, electric power can be supplied from vehicle 1 to electrical devices in house 800. Moreover, in FIG. 2, plug 308 of power cable 300 is electrically connected with power supply plug 710 of electric device 700 via an adaptor 720. Accordingly, electric power can be supplied to electric devices individually from vehicle 1.

The object of external power feeding is not particularly limited. By using a vehicle as an electric power supplying source, as shown in FIG. 2, the concept of supplying electric power from a vehicle to a general electrical device outside the vehicle is now in consideration. For example, vehicle 1 may be used as an emergency power supply at the time of disaster such as an earthquake.

Engine 10 may operate during external power feeding from vehicle 1. Vehicle 1 must be prevented from moving during power feeding, that may occur by the driving power generated by engine 10. Therefore, in the present embodiment, external power feeding is permitted when the parking switch is actuated.

Figure 3:
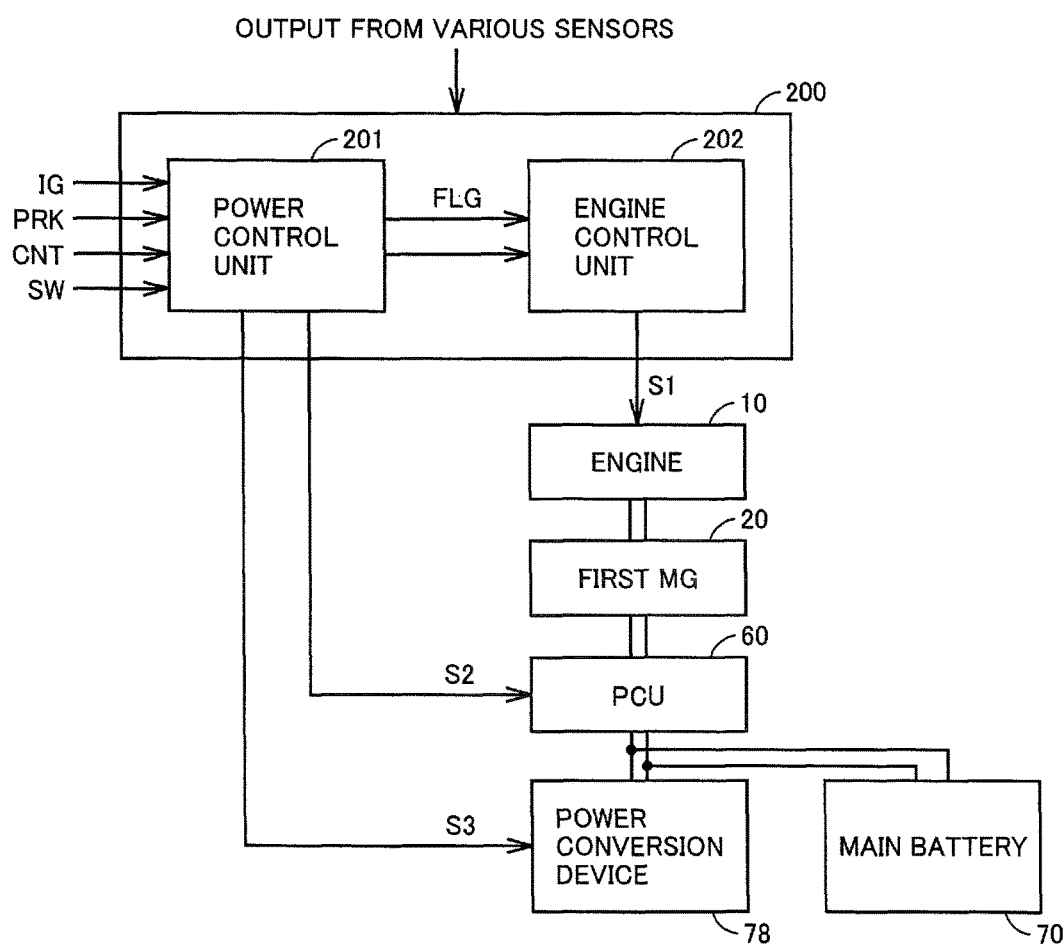
FIG. 3 is a functional block diagram of an ECU 200 shown in FIG. 1.

FIG. 3 is a functional block diagram of ECU 200 shown in FIG. 1. The functional blocks shown in FIG. 3 can be implemented by any of hardware and software. Referring to FIG. 3, ECU 200 includes a power control unit 201, and an engine control unit 202. Power control unit 201 implements "prohibition unit" of the present invention. Engine control unit 202 implements "parameter updating unit" of the present invention.

ECU 200 receives outputs from various sensors related to engine 10 (air-fuel ratio sensor 113A, air flow meter 112B, knocking sensor 144, and the like). At least air-fuel ratio sensor 113A, air flow meter 112B and knocking sensor 144 among the various sensors related to engine 10 generate signals required for controlling the operation of engine 10. In more detail, air-fuel ratio sensor 113A, air flow meter 112B and knocking sensor 144 detect the physical amount required to operate an actuator (not shown) of engine 10, and outputs a signal indicating the detected physical amount to ECU 200. ECU 200 also receives outputs from various sensors (voltage sensor 160, and the like) to detect the state of main battery 70. Based on these outputs from these sensors, power control unit 201 generates a control signal S2 directed to controlling charging or discharging of main battery 70, for example, and transmits generated control signal S2 to PCU 60.

Engine control unit 202 generates control signal S1 directed to controlling engine 10, based on the outputs from various sensors. Engine control unit 202 outputs the generated control signal S1 to engine 10. More specifically, engine control unit 202 executes learning control based on the output from various sensors. In learning control, control of engine 10 is initiated based on a control parameter that is prestored by engine control unit 202. The output from various sensors is fed back to engine control unit 202, and engine control unit 202 learns (corrects) the control parameter. The control parameter is stored in engine control unit 202.

In the present embodiment, learning control of engine 10 includes, but is not limited to, air-fuel ratio feedback control, ignition timing control, and idle speed control (ISC). Examples of each learning control will be described hereinafter. The following description is not intended to exclude any other specific control method.

(1) Air-Fuel Ratio Feedback Control

Engine control unit 202 controls the fuel injection amount from fuel injection device 104 so as to achieve the target air-fuel ratio based on the output from air-fuel ratio sensor 113A. Deviation in the actual air-fuel ratio from the target air-fuel ratio is calculated during operation of engine 10 under a certain condition. Based on the deviation, engine control unit 202 calculates the correction amount of the fuel injection amount. Engine control unit 202 stores the correction amount as a learning value. Thereafter, engine control unit 202 controls the fuel injection amount from fuel injection device 104 using the learning value.

(2) Ignition Timing Control

The ignition timing is learned by a knock control system (KCS) control. Engine control unit 202 determines whether knocking has occurred or not based on a signal KN output from knocking sensor 144. When a determination is made that knocking has occurred, the ignition timing is retarded from the basic ignition timing. The basic ignition timing is determined according to operating state of engine 10. When a determination is made that knocking has not occurred, the timing ignition is advanced. The timing retarding amount from the basic ignition timing is learned (stored) as a KCS learning value. Therefore, the ignition timing retarded from the basic ignition timing by the KCS learning value may become the actual ignition timing.

(3) Idle Speed Control

The engine speed when engine 10 is under a no-load state is adjusted to the target speed. First, the base value of the idle target rotational speed is set at a no-load state of engine 10. For example, a map directed to determining the base value of the idle target rotational speed is preset based on the temperature of the coolant, the vehicle speed, and the like. This base value may be taken as the idle target rotational speed. Alternatively, the idle target rotational speed may be determined by multiplying the base value with a correction coefficient. The engine speed is measured by engine speed sensor 11 for a predetermined period. In the case where the measured rotational speed and the idle target rotational speed differ, engine control unit 202 corrects the air intake amount into engine 10 such that the measured rotational speed reaches the idle target rotational speed. For example, engine control unit 202 prestores the air intake amount under the same condition (coolant temperature, vehicle speed, load, and the like) as a control parameter. Engine control unit 202 initiates control of electronic throttle valve 112D according to the control parameter. Accordingly, the idle speed at the time of initiating control is controlled so as not to greatly deviate from the target speed. The air intake amount is detected by air flow meter 112B. When the idle speed reaches the target speed, engine control unit 202 learns (stores) the air intake amount at that time as the learning value.

Power control unit 201 outputs a flag FLG indicating prohibition of learning to engine control unit 202. Based on signals IG, PRK, CNT and SW, power control unit 201 determines that the user has selected external power feeding. In this case, power control unit 201 sends an instruction directed to operating engine 10 to engine control unit 202. In addition, power control unit 201 sets flag FLG such that learning of the control parameter by engine control unit 202 is prohibited. In this case, flag FLG is set to "1", for example. Power control unit 201 also generates a control signal S3 directed to controlling power conversion device 78 such that power conversion device 78 executes external power feeding. Power control unit 201 outputs generated control signal S3 to power conversion device 78.

When learning is prohibited, engine control unit 202 does not update the control parameter, for example. In other words, the control parameter stored in engine control unit 202 is not updated. Accordingly, the control parameter obtained by learning during the previous running operation of vehicle 1 is used for control of engine 10 during power feeding.

A possible case of prohibiting learning is when the control signal output from engine control unit 202 does not change even though the sensor output has changed. For example, a possible case is when the control amount does not change. This may be attributed to the air-fuel ratio being maintained at a level differing from the target air-fuel ratio. Alternatively, this may be attributed to the idle speed being shifted at a speed differing from the target rotational speed. Alternatively, this may be attributed to the ignition timing remaining at a timing differing from the optimum ignition timing.

However, when engine 10 is operating normally, power control unit 201 cancels the setting of flag FLG. For example, flag FLG is set to "0". "Engine 10 operating normally" includes the case where the power of engine 10 is used for the running of vehicle 1. Therefore, the driving of engine 10 for the purpose of charging main battery 70 when vehicle 1 is running with second MG 30 alone is included in the normal operation of engine 10. Further, there may be the case where engine 10 is in the state of idling during temporary halting of vehicle 1 at a traffic light. The engine operation at this stage is included in "engine 10 operating normally".

In this specification, "vehicle at a halt" corresponds to the state where motive power of the vehicle is not generated. Vehicle 1 at a parking state is included in "vehicle at a halt". In the present embodiment, the driving of drive shaft 16 is prohibited by an operation of parking switch 91. Therefore, the motive power of the vehicle will not be generated.

Figure 4:
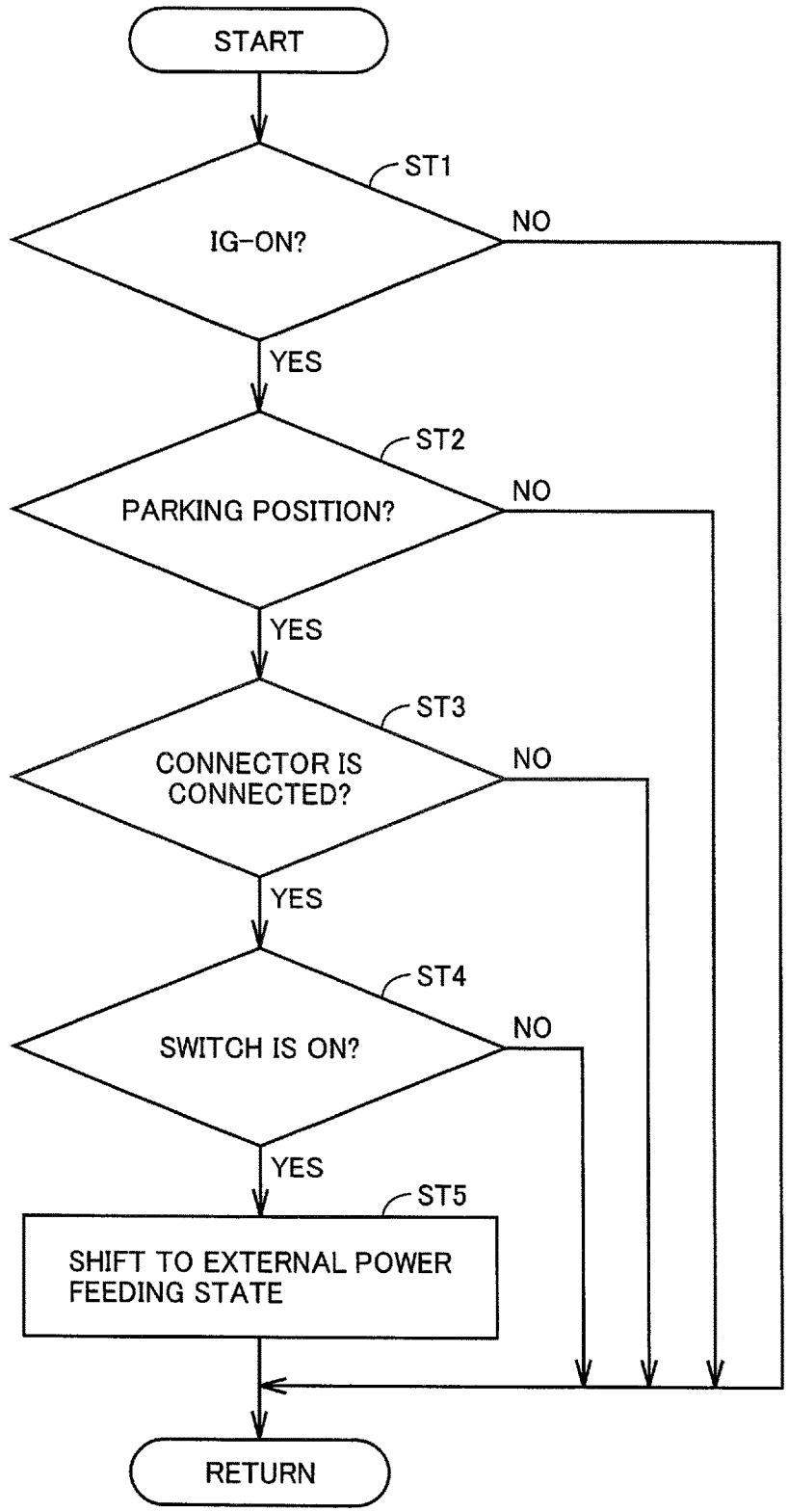
FIG. 4 is a flowchart representing a process for transition of the vehicle to an external power feeding state according to the first embodiment.

FIG. 4 is a flowchart representing a process for transition of the vehicle to an external power feeding state according to the first embodiment. The process in this flowchart is invoked from the main routine at every predetermined cycle, for example, to be executed by ECU 200 (for example, power control unit 201).

Referring to FIGS. 1, 2 and 4, ECU 200 determines at step ST1 whether the entire system of vehicle 1 is at an IG-ON state based on signal IG. When a determination is made that the system is at an IG-ON state (YES at step ST1), control proceeds to step ST2. When a determination is made that the system is at a state other than the IG-ON state (NO at step ST1), the entire control is returned to the main routine.

At step ST2, ECU 200 determines whether the parking position is selected or not based on signal PRK. Since the possibility of engine 10 operating is high during external power feeding, the moving of vehicle 1 must be regulated. The process of step ST2 is executed to determine whether vehicle 1 is reliably parked or not. When a determination is made that the parking position is selected (YES at step ST2), control proceeds to step ST3. When a determination is made that the parking position is not selected (NO at step ST2), the entire control returns to the main routine.

At step ST3, ECU 200 determines, based on signal CNT, whether connector 310 of power cable 300 is connected with socket 84 of vehicle 1. When a determination is made that connector 310 is connected to socket 84 (YES at step ST3), control proceeds to step ST4. When a determination is made that connector 310 is not connected to socket 84 (NO at step ST3), the entire control returns to the main routine.

At step ST4, ECU 200 determines whether switch 314 of connector 310 is turned ON or not based on signal SW. "ON of switch 314" means that external power feeding has been selected by switch 314. When a determination is made that switch 314 is ON (YES at step ST4), control proceeds to step ST5. When a determination is made that switch 314 is OFF (NO at step ST4), the entire control returns to the main routine. "OFF of switch 314" means that charging of vehicle 1 has been selected by switch 314.

At step ST5, ECU 200 causes vehicle 1 to shift to an external power feeding state. When the process of step ST5 ends, the entire control returns to the main routine. The process of steps ST1-ST5 is directed to detecting whether vehicle 1 is at a power generatable state. A power generatable state is the state where vehicle 1 is at a halt, and electric power can be generated from first MG 20 by the driving of engine 10. A power generatable state is detected when the system of vehicle 1 is at a conducting state, vehicle 1 is at a halt, connector 310 of power cable 300 is connected to the socket of vehicle 1, and external power feeding is selected. In this case, vehicle 1 shifts to an external power feeding state.

Figure 5:
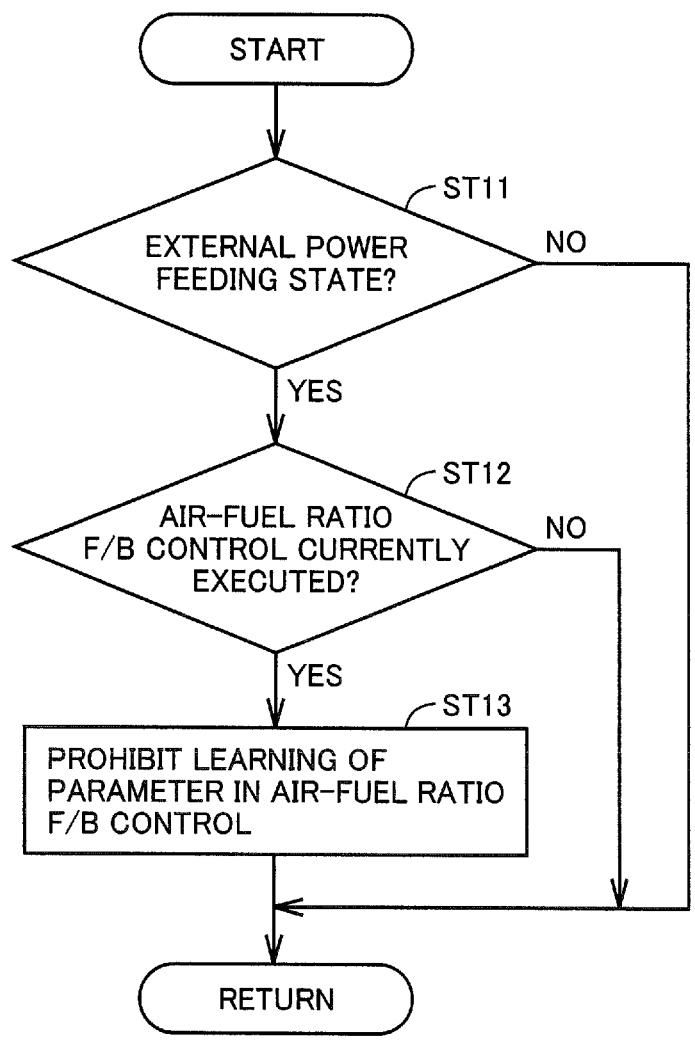
FIG. 5 is a flowchart to describe a first process of prohibiting learning of a control parameter during external power feeding.

FIG. 5 is a flowchart to describe the first process of prohibiting learning of a control parameter during external power feeding. The process in the flowchart is invoked from the main routine at every predetermined period, for example, to be executed by ECU 200.

Referring to FIGS. 1 and 5, ECU 200 determines whether the current state of vehicle 1 is at an external power feeding state at step ST11. For example, ECU 200 stores information indicating that the process shown in FIG. 4 has been executed. Based on this information, a determination is made whether vehicle 1 is currently at an external power feeding state. Alternatively, ECU 200 may detect that vehicle 1 is actually performing external power feeding.

When a determination is made that the current state is an external power feeding state (YES at step ST11), control proceeds to step ST12. In contrast, when a determination is made that the current state of vehicle 1 is not an external power feeding state (NO at step ST11), the entire control returns to the main routine.

At step ST12, ECU 200 determines whether air-fuel ratio feedback (in FIG. 5, feedback is represented as F/B) control is currently executed or not. For example, when engine control unit 202 calculates the amount of deviation of the actual air-fuel ratio (output from air-fuel ratio sensor 113A) relative to the target air-fuel ratio, a determination is made that air-fuel ratio feedback control is currently executed. A determination of air-fuel ratio feedback control being currently executed may be made when flag FLG output from power control unit 201 is set at "0".

When during execution of air-fuel ratio feedback control (YES at step ST12), control proceeds to step ST13. When air-fuel ratio feedback control is not executed (NO at step ST12), the entire control returns to the main routine.

At step ST13, ECU 200 prohibits learning of a parameter in air-fuel ratio feedback control. For example, power control unit 201 sets flag FLG at "1". Engine control unit 202 prohibits parameter learning based on flag FLG at value "1". Therefore, the parameter stored at engine control unit 202 is not updated. The control parameter used in air-fuel ratio feedback control is the air-fuel ratio. At the termination of the process of step ST13, the entire control returns to the main routine.

Figure 6:
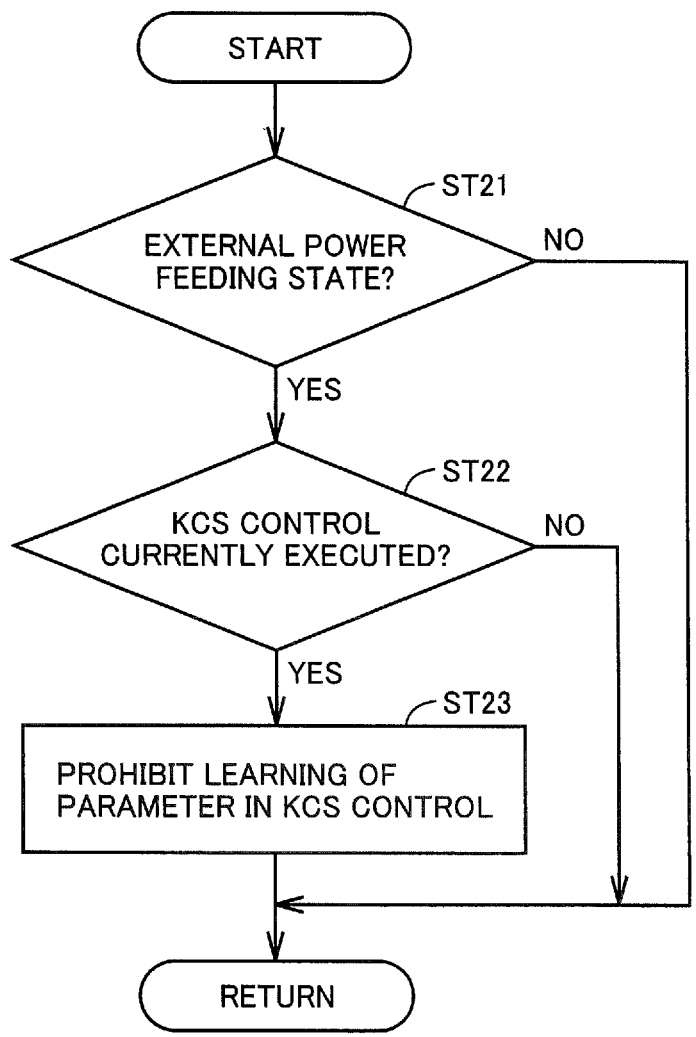
FIG. 6 is a flowchart to describe a second process of prohibiting learning of a control parameter during external power feeding.

FIG. 6 is a flowchart to describe the second process of prohibiting learning of a control parameter during external power feeding. The process in this flowchart is invoked from the main routine at every predetermined cycle, for example, to be executed by ECU 200.

Referring to FIGS. 1 and 6, ECU 200 determines whether the current state of vehicle 1 is at an external power feeding state at step ST21. Since this process is similar to the process of step ST11 shown in FIG. 5, detailed description thereof will not be repeated. When a determination is made that the current state is an external power feeding state (YES at step ST21), control proceeds to step ST22. When a determination is made that the current state of vehicle 1 is not an external power feeding state (NO at step ST21), the entire control returns to the main routine.

At step ST22, ECU 200 determines whether KCS control is currently executed. For example, a determination is made that KCS control is currently executed when engine control unit 202 learns the ignition timing. A determination may be made that KCS control is currently executed when flag FLG output from power control unit 201 is set at "0".

When KCS control is currently executed (YES at step ST22), control proceeds to step ST23. When KCS control is not executed (NO at step ST22), the entire control returns to the main routine.

At step ST23, ECU 200 prohibits learning of a parameter in KCS control. For example, power control unit 201 sets flag FLG at "1". Engine control unit 202 prohibits parameter learning based on flag FLG at value "1". Therefore, the parameter stored at engine control unit 202 is not updated. The control parameter in KCS control is the timing retarding amount from the basic ignition timing. Upon termination of the process of step ST23, the entire control returns to the main routine.

Figure 7:
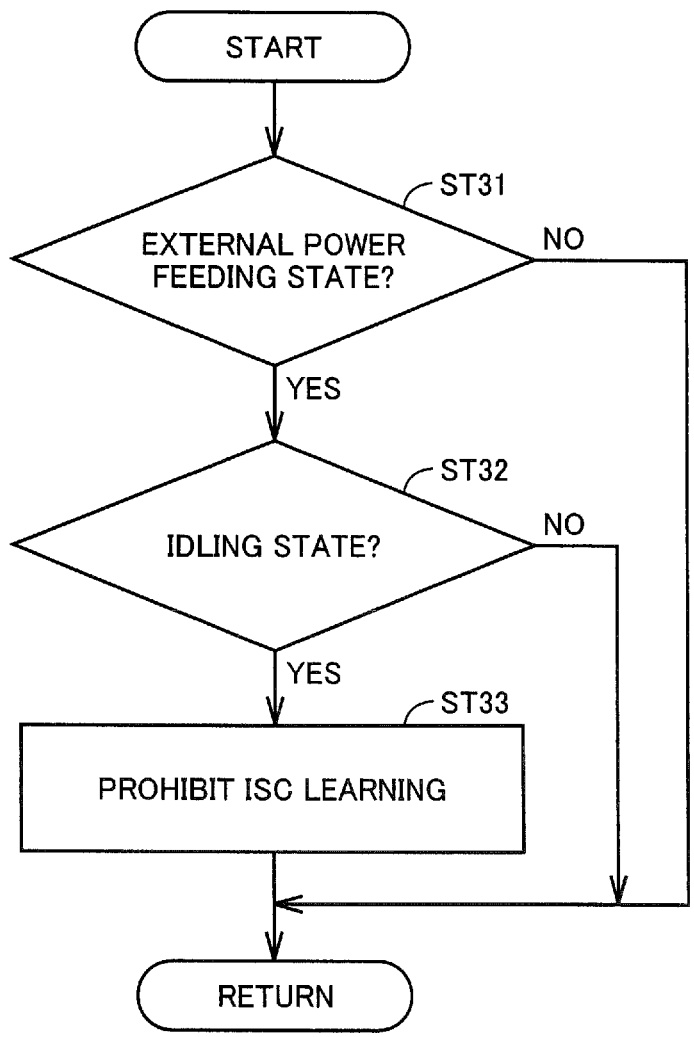
FIG. 7 is a flowchart to describe a third process of prohibiting learning of a control parameter during external power feeding.

FIG. 7 is a flowchart to describe the third process of prohibiting learning of a control parameter during external power feeding. The process in this flowchart is invoked from the main routine at every predetermined cycle, for example, to be executed by ECU 200.

Referring to FIGS. 1 and 7, ECU 200 determines whether the current state of vehicle 1 is an external power feeding state at step ST31. Since this process is similar to the process of step ST11 shown in FIG. 5, detailed description thereof will not be repeated. When a determination is made that the current state is an external power feeding state (YES at step ST31), control proceeds to step ST32. When a determination is made that the current state of vehicle 1 is not an external power feeding state (NO at step ST31), the entire control returns to the main routine.

At step ST32, ECU 200 determines whether engine 10 is at an idle state. For example, a determination may be made that engine 10 is at an idle state based on the load of engine 10. When engine control unit 202 is currently executing idle speed control, a determination is made that engine 10 is at an idle state.

When engine 10 is at an idle state (YES at step ST32), control proceeds to step ST33. When engine 10 is not at an idle state (NO at step ST32), the entire control returns to the main routine.

At step ST33, ECU 200 prohibits ISC learning, i.e. learning of the parameter used in ISC. For example, power control unit 201 sets flag FLG at "1". Engine control unit 202 prohibits parameter learning based on flag FLG at value "1". Therefore, the parameter stored at engine control unit 202 is not updated. The control parameter used in ISC control is the air intake amount. Upon termination of the process of step ST33, the entire control returns to the main routine.

In one embodiment, the process of step ST12 may be omitted. In this case, when a determination of an external power feeding state is made (YES at step ST11), learning of a parameter in air-fuel ratio feedback control is prohibited (step ST13). Similarly, the process of step ST22, or step ST32 can be omitted.

Prohibition of parameter learning is canceled when a determination is made that the state is not an external power feeding state. In this case, power control unit 201 sets flag FLG at "0". The timing of canceling prohibition of parameter learning is not limited to this example.

When external power feeding is performed, vehicle 1 is at a halt. Therefore, the operating state of engine 10 during external power feeding differs from the normal operating state. A normal state is specifically the state of engine 10 when engine 10 is used for the running of vehicle 1. During vehicle running, engine 10 is used for vehicle 1 running or stopped, according to the vehicle speed. During usage of engine 10 for running of vehicle 1, the rotational speed and torque of engine 10, for example, may change. During external power feeding, engine 10 is used for driving first MG 20. Therefore, the amount of change in the rotational speed and torque of engine 10 during external power feeding is considered to be small as compared to the case of a running operation of vehicle 1.

In learning control, the control parameter prestored at ECU 200 is used for the purpose of causing the engine operating state to arrive at the target state as soon as possible. The control parameter has been obtained by previous learning.

Let us assume that the control parameter of engine 10 has been learned during external power feeding. In this case, the control parameter stored in ECU 200 (engine control unit 202) is modified during external power feeding. However, the operating state of engine 10 may differs between an external power feeding state and a running state of vehicle 1. Therefore, there is a possibility that the control parameter obtained by learning during external power feeding may greatly differ from the control parameter obtained by learning during the previous running of vehicle 1. Therefore, there is a possibility that, when the control parameter is updated during external power feeding, control of engine 10 when running of vehicle 1 is initiated subsequent to external power feeding may be influenced. For example, it may become difficult to cause engine 10 to arrive at the optimum state in a short period of time when engine 10 directly drives vehicle 1.

According to the present embodiment, learning control of engine 10 is prohibited while engine 10 is operating during external power feeding. Therefore, the control parameter obtained by the learning control of a previous running is maintained. Therefore, the effect on the running of vehicle 1 can be reduced when running of vehicle 1 by the driving force of engine 10 is initiated.

For example, by prohibiting air-fuel ratio feedback control, the target air-fuel ratio can be reached at a short period of time during running of vehicle 1 subsequent to external power feeding. Therefore, great variation in the exhaust gas concentration, for example, can be suppressed. Further, the possibility of degradation in driveability can be reduced. By prohibiting KCS control, the optimum ignition timing can be calculated in a short period of time during running of vehicle 1 subsequent to external power feeding. Therefore, the possibility of the driveability being degraded can be reduced. By prohibiting idle speed control, degradation in the startability of engine 10 subsequent to external power feeding can be suppressed. In other words, favorable startability of engine 10 can be ensured. Thus, the possibility of the driveability being degraded can be reduced.

External power feeding was described as an example of the case where learning of a control parameter of engine 10 is prohibited. The present invention is not limited to external power feeding, and learning of a control parameter of engine 10 may be prohibited when engine 10 is to be operated for power generation when vehicle 1 is at a halt.

For example, a possible case is where air conditioner 65 is operated when vehicle 1 is at halt. As mentioned above, air conditioner 65 operates by the electric power stored in main battery 70. In the case where main battery 70 is charged by an external power supply, the electric power for operating air conditioner 65 can be supplied from the external power supply. However, in the case where vehicle 1 is at a halt and main battery 70 is not charged by an external power supply, the operation of air conditioner 65 will cause reduction in the SOC of main battery 70. In this case, the event of requiring charging of main battery 70 may occur. In the case where main battery 70 has to be charged, ECU 200 operates engine 10. Engine 10 drives first MG 20 to cause generation of electric power. Even in such a case, ECU 200 may prohibit learning of a control parameter of the engine. For example, in the flowchart shown in FIGS. 5-7, a determination is made whether first MG 20 is generating power or not during a halt of the vehicle, instead of determining whether at an external power feeding state or not. When a determination is made that first MG 20 is generating power during a halt of the vehicle, air-fuel ratio feedback control, KCS control, and idle control are prohibited.

Figure 8:
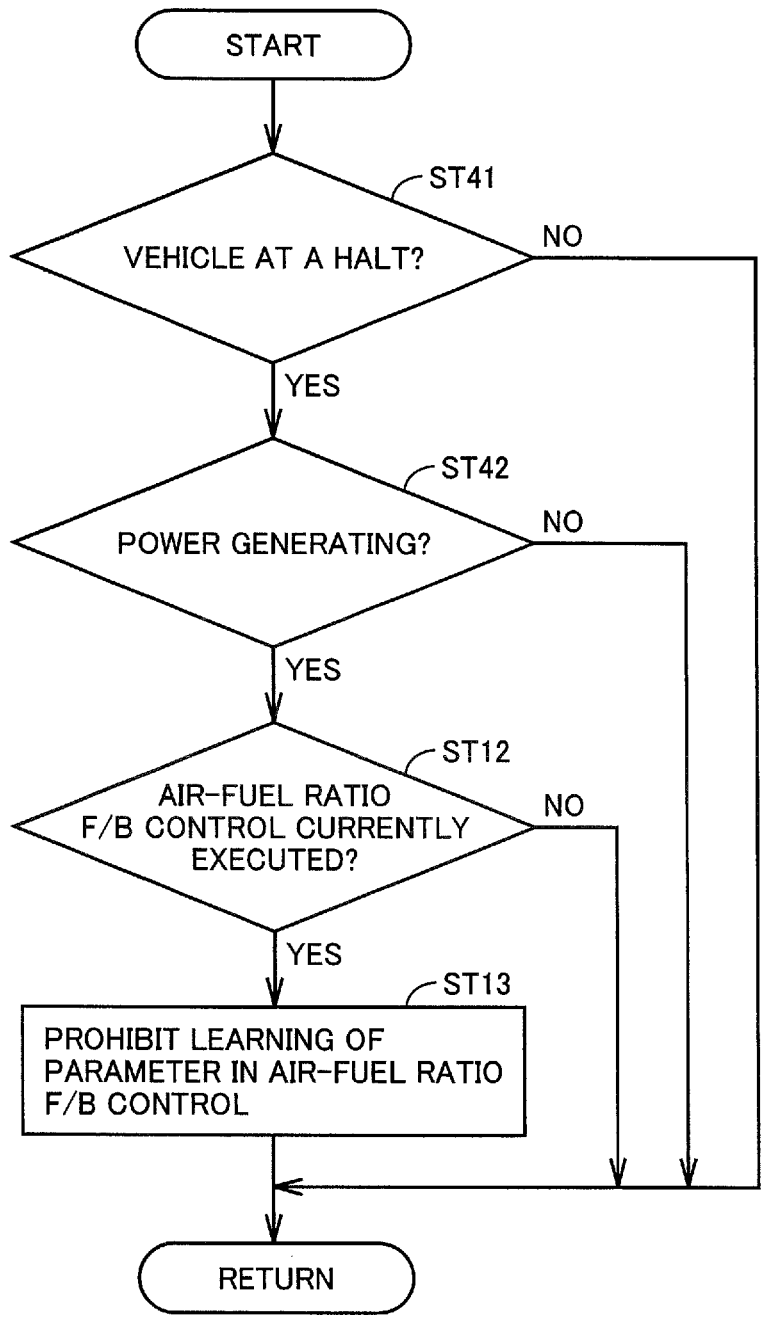
FIG. 8 is a flowchart to describe another process of prohibiting learning of a control parameter.

FIG. 8 is a flowchart to describe another process of prohibiting learning of a control parameter. Referring to FIGS. 5 and 8, the process of steps ST41 and ST42 is executed instead of the process of step ST11. At step ST41, ECU 200 determines whether the vehicle is at a halt or not. ECU 200 determines whether vehicle 1 is at a halt or not based on, for example, signal PRK. When a determination is made that the vehicle is at a halt (YES at step ST41), control proceeds to step ST42. When a determination is made that the vehicle is not at a halt (NO at step ST41), the entire control returns to the main routine.

At step ST42, ECU 200 determines whether vehicle 1 is currently generating power or not. For example, ECU 200 determines that vehicle 1 is currently generating power when first resolver 12, for example, detects the rotational speed of first MG 20. In this case (YES at step ST42), control proceeds to step ST12. When vehicle 1 is not generating power (NO at step ST42), the entire control returns to the main routine. Description of the process of steps ST12 and ST13 will not be repeated.

Figure 9:
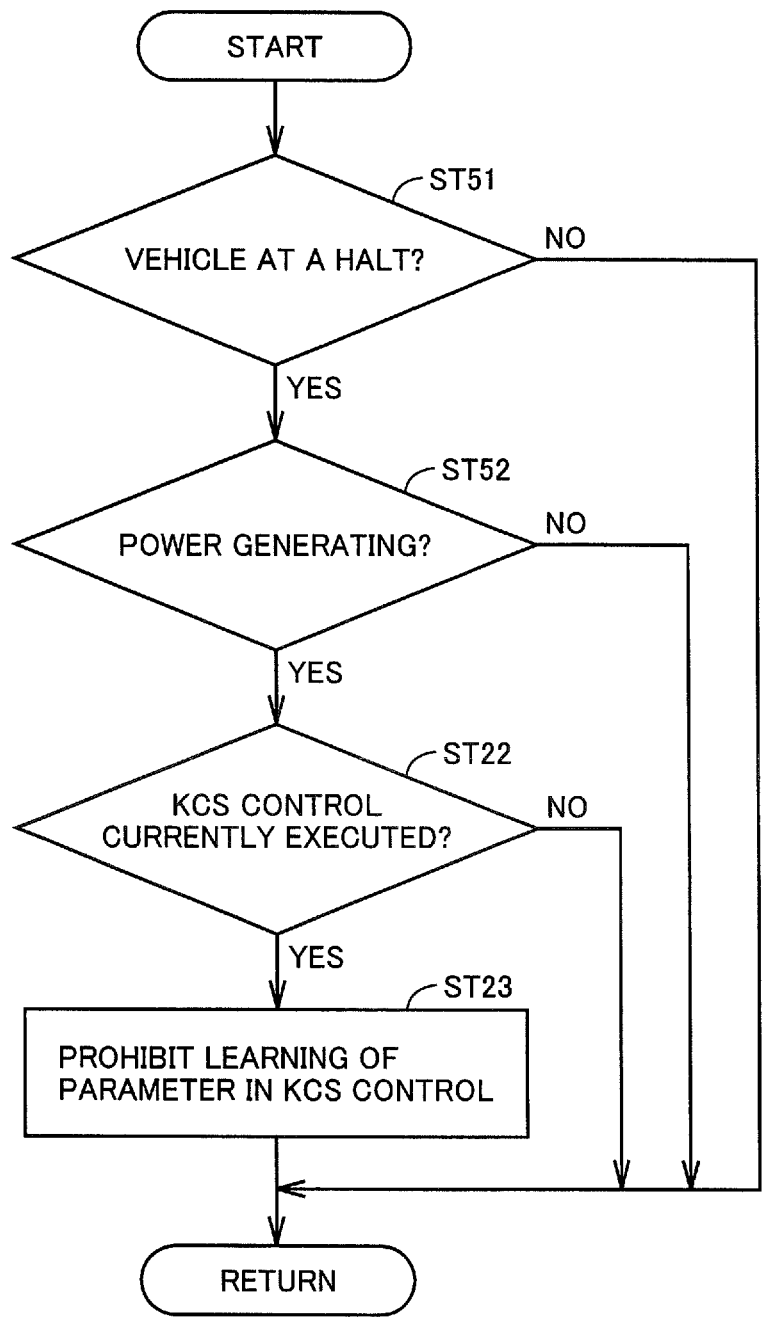
FIG. 9 is a flowchart to describe still another process of prohibiting learning of a control parameter.

FIG. 9 is a flowchart to describe still another process of prohibiting learning of a control parameter. Referring to FIGS. 6 and 9, the process of steps ST51 and ST52 is executed instead of the process of step ST21. Since the process of steps ST51 and ST52 is similar to the process of steps ST41 and ST42, description thereof will not be repeated.

Figure 10:
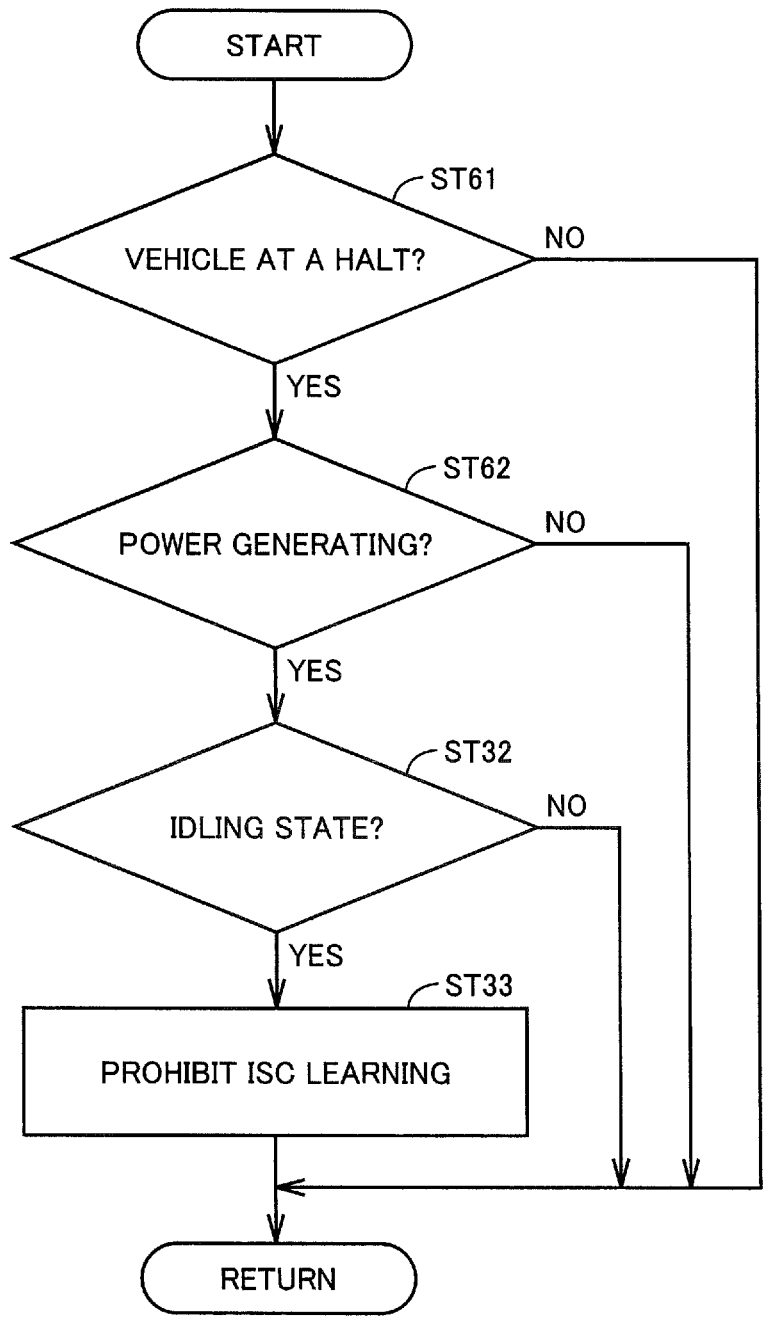
FIG. 10 is a flowchart to describe still another process of prohibiting learning of a control parameter.

FIG. 10 is a flowchart to describe still another process of prohibiting learning of a control parameter. Referring to FIGS. 7 and 10, the process of steps ST61 and ST62 is executed instead of the process of step ST31. Since the process of steps ST61 and ST62 is similar to the process of steps ST41 and ST42, description thereof will not be repeated.

The process shown in FIGS. 8-10 is invoked from the main routine at every predetermined cycle to be executed by ECU 200. The process of steps ST41, ST42, the process of steps ST51, ST52 or steps ST61, ST62 is directed to detecting that the vehicle is at a power generatable state. By the process shown in FIGS. 8-10, an advantage similar to that obtained by prohibiting update of the control parameter during external power feeding can be achieved.

Second Embodiment

Figure 11:
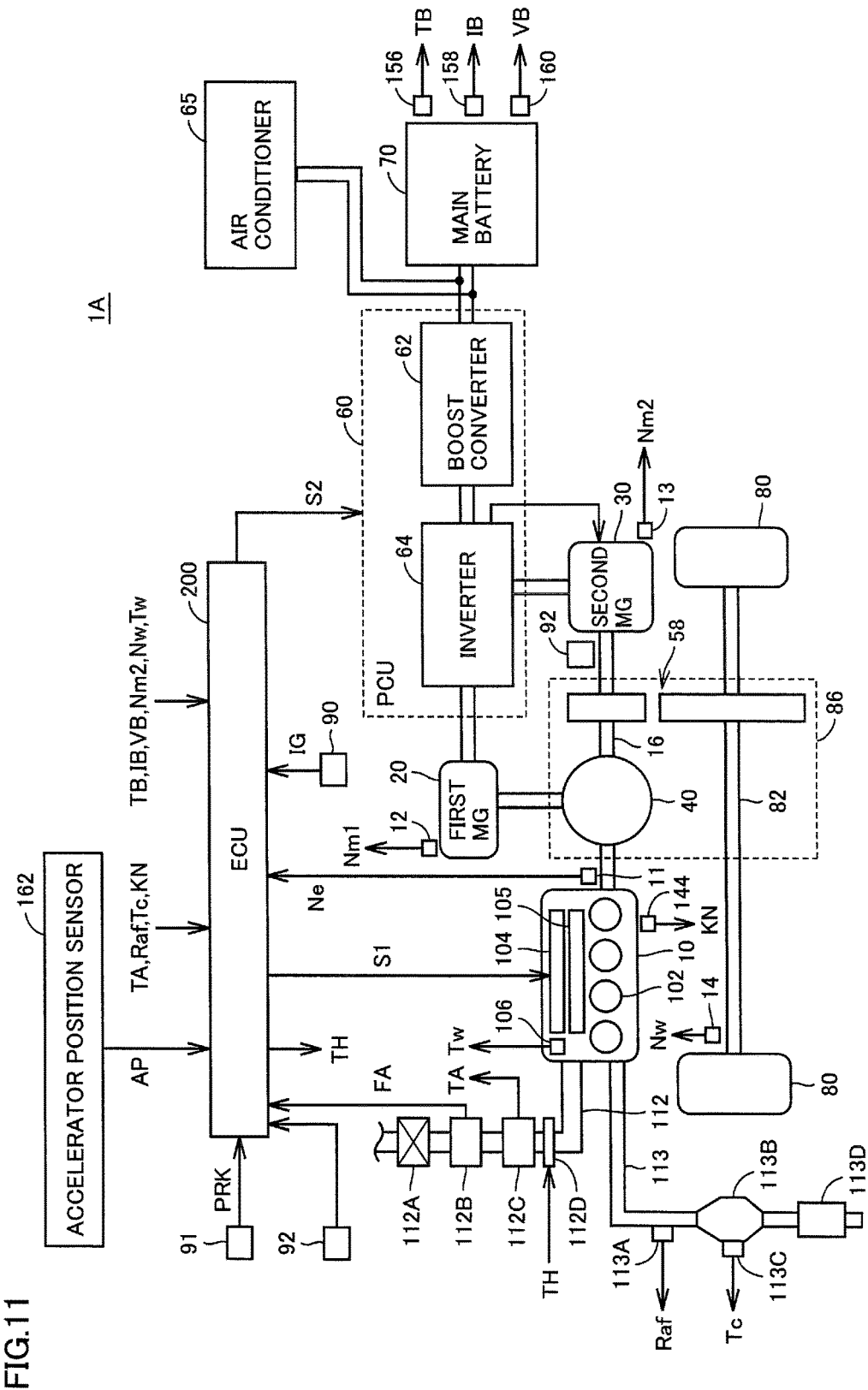
FIG. 11 is an entire block diagram of a vehicle 1A according to a second embodiment of the present invention.

FIG. 11 is an entire block diagram of a vehicle 1A according to a second embodiment of the present invention. Referring to FIGS. 1 and 11, vehicle 1A differs from vehicle 1 in the absence of power conversion device 78 for external power feeding. Since the configuration of the remaining elements in vehicle 1A is similar to that of corresponding elements in vehicle 1, description thereof will not be repeated.

In vehicle 1A shown in FIG. 11, engine 10 may be driven for the purpose of power generation when the vehicle is at a halt. As described in the first embodiment, there is a possibility of air conditioner 65 being operated when vehicle 1A is at a halt. In the case where charging of main battery 70 is required, ECU 200 operates engine 10. In this case, the process shown in FIGS. 8-10 is executed. According to the second embodiment, an advantage similar to that of first embodiment can be achieved.

Each of the embodiments set forth above has been described based on a vehicle configured to have the power of the engine divided and transmitted to the axle and power generator by the power split mechanism as one type of the vehicle having an internal combustion engine used for the running of the vehicle and the driving of the power generator. If the control parameter is to be learned (corrected) for controlling the internal combustion engine, the present invention is applicable to various types of vehicles having an internal combustion engine used for the running of the vehicle and the driving of the power generator.

In each of the embodiments set forth above, the running of the vehicle and the driving of the power generator have been indicated as two independent functions of the internal combustion engine. However, in the present invention, the internal combustion engine is not limited to one that directly drives the vehicle. For example, the internal combustion engine may be used to drive the power generator (or may be the motor generator). If the electric motor drives the vehicle by the electric power generated by such a power generator, the present invention is applicable to that vehicle. Therefore, the vehicle to which the present invention can be applied is not limited to the vehicle shown in each of the embodiments set forth above.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

REFERENCE SIGNS LIST 1, 1A vehicle; 10 engine; 11 engine speed sensor; 12 first resolver; 13 second resolver; 14 wheel speed sensor; 16 drive shaft; 20 first MG; 30 second MG; 40 power split device; 58 reduction gear; 60 PCU; 62 boost converter; 64 inverter; 65 air conditioner; 70 main battery; 78 power conversion device; 80 driving wheel; 82 axle; 84 socket; 86 transmission; 90 IG switch; 91 parking switch; 92 shift lever; 93 parking lock device; 102 cylinder; 104 fuel injection device; 105 ignition device; 106 coolant temperature sensor; 112 intake passage; 112A air cleaner; 112B air flow meter; 112C intake air temperature sensor; 112D electronic throttle valve; 113 exhaust passage; 113A air-fuel ratio sensor; 113B a-way catalytic converter; 113C catalyst temperature sensor; 113D muffler; 144 knocking sensor; 156 temperature sensor; 158 current sensor; 160 voltage sensor; 162 accelerator position sensor; 200 ECU; 201 power control unit; 202 engine control unit; 300 power cable; 301, 308 flag; 302 external power supply; 304 power line; 310 connector; 700 electric device; 710 power supply flag; 720 adapter; 800 house.

The invention claimed is:

1. A control device of a vehicle comprising a power generator and an internal combustion engine, said internal combustion engine used for running said vehicle and for driving said power generator, said control device comprising:
    at least one sensor generating a signal to control an operation of said internal combustion engine;
    a control unit configured to store a control parameter to control an operation of said internal combustion engine, and to correct said control parameter based on said signal of said at least one sensor, the control unit including:
- a parameter updating unit configured to correct said control parameter, and
- a prohibition unit instructing said parameter updating unit to prohibit correction of said control parameter when said vehicle is at a halt and said power generator is generating power by driving of said internal combustion engine such that electric power generated from said power generator is output outside of said vehicle by an electric circuit, said control unit restarting correcting said control parameter when said electric power is no longer output outside of said vehicle.

2. The control device of a vehicle according to claim 1, wherein said control parameter is at least one of an air-fuel ratio, a timing retarding amount of ignition timing, and an air intake amount during an idle operation of said internal combustion engine.

3. A vehicle comprising:
- a power generator,
- an internal combustion engine used for running said vehicle and for driving said power generator;
- at least one sensor generating a signal to control an operation of said internal combustion engine;
- a control unit configured to store a control parameter to control an operation of said internal combustion engine, and to correct said control parameter based on said signal of said at least one sensor, the control unit including:
  - a parameter updating unit configured to correct said control parameter, and
  - a prohibition unit instructing said parameter updating unit to prohibit correction of said control parameter when said vehicle is at a halt and said power generator is generating power by driving of said internal combustion engine such that electric power generated from said power generator is output outside of said vehicle by an electric circuit, said control unit restarting correcting said control parameter when said electric power is no longer output outside of said vehicle.

4. A control method of a vehicle comprising a power generator, an internal combustion engine, and an electric circuit configured to allow electric power generated at said power generator to be output outside of said vehicle, said internal combustion engine used for running said vehicle and for driving said power generator, said control method comprising the steps of:
- correcting a control parameter to control said internal combustion engine based on an output of at least one sensor generating a signal to control an operation of said internal combustion engine,
- correcting said control parameter,
- instructing to prohibit correction of said control parameter when said vehicle is at a halt and said power generator is generating power by driving of said internal combustion engine such that electric power generated from said power generator is output outside of said vehicle by an electric circuit, and restarting correcting said control parameter when said electric power is no longer output outside of said vehicle.

5. The control method of a vehicle according to claim 4, wherein said control parameter is at least one of an air-fuel ratio, a timing retarding amount of ignition timing, and an air intake amount during an idle operation of said internal combustion engine.

* * * * *